United States Patent Office 3,534,081
Patented Oct. 13, 1970

---

3,534,081
[(2-BENZOYLPHENYLCARBAMOYL) METHYL] CARBAMIC ACID ESTERS
Stanley C. Bell, Narberth, Pa., assignor to American Home Products Corporation, New York, N.Y., a corporation of Delaware
No Drawing. Filed July 10, 1967, Ser. No. 651,999
Int. Cl. C07c 101/78
U.S. Cl. 260—470                    6 Claims

---

ABSTRACT OF THE DISCLOSURE

The present invention is concerned with [(2-benzoylphenylcarbamoyl) methyl] carbamic acid esters which have demonstrated pharmacological activity as sedative agents.

---

The present invention relates to new and novel [(2-benzoylphenylcarbamoyl) methyl] carbamic acid esters which are pharmacodynamically active as sedatives.

The new and novel compounds within the scope of the present invention are represented by the following structural formula:

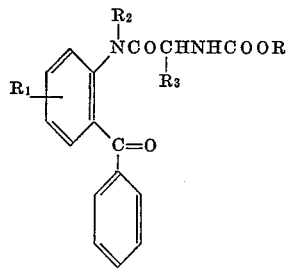

wherein R is lower alkyl; $R_1$ is selected from the group consisting of hydrogen, halogen, lower alkyl, and lower alkoxy; $R_2$ is selected from the group consisting of hydrogen and lower alkyl; and $R_3$ is selected from the group consisting of amino, lower alkoxy and lower alkylthio. Typical examples thereof are: [(2-benzoyl-4-chlorophenylcarbamoyl) (ethoxy) methyl] carbamic acid, ethyl ester; [(2 - benzoyl - 4 - bromophenylcarbamoyl) (ethylmercapto) methyl] carbamic acid, propyl ester; and [(2-benzoylphenylcarbamoyl) (methoxy) methyl] carbamic acid, methyl ester.

The new and novel compounds of the present invention may be prepared by the process depicted in the following equation:

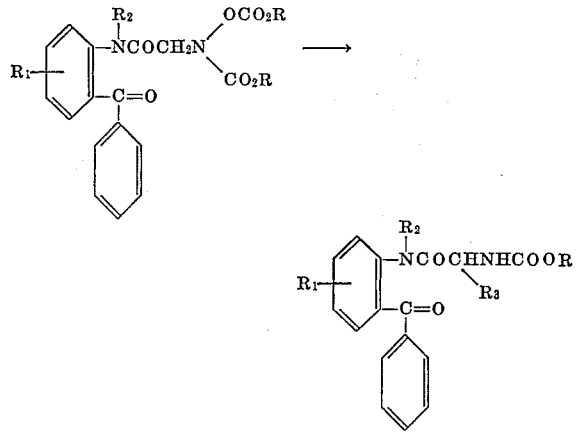

wherein R, $R_1$, $R_2$, and $R_3$ are defined as above. The reaction effected by admixing an appropriate [(2-benzoylphenylcarbamoyl)methyl]hydroxy carbamic acid, alkyl ester, alkyl carbonate with a nucleophile, e.g., an alkanol, an amine and an alkyl mercaptan which mixture is then admixed with an excess of an alkaline solution, e.g., an alkali metal hydroxide, an alkali metal carbonate or triethylamine. Preferably this reaction is conducted with an alkaline solution which contains sodium hydroxide.

When the reaction is complete, the product is separated by standard recovery procedures. For example, the reaction mixture is diluted with water, the precipitate collected by filtration and then recrystallized from a suitable solvent, e.g., an alkanol.

Many of the nucleophiles used as reactants herein are known compounds which are commercially available. Others may be prepared by organic procedures well known to those skilled in the art of chemistry. The [(2-benzoylphenylcarbamoyl)methyl] hydroxy carbamic acid, alkyl ester, alkyl carbonate reactants are described and prepared by the procedure described in copending U.S. patent application, Ser. No. 528,623, filed on Feb. 18, 1966 and entitled "Benzodiazepine Derivatives."

In accordance with the present invention, the new compounds herein described have been found to possess interesting pharmacological properties which render them useful as sedatives. More particularly; these compounds, in standard pharmacological tests on mice, have exhibited utility as sedatives at a dosage of about 120 mg. per kilogram of body weight.

When the compounds of this invention are employed as sedatives, they may be administered alone or in combination with acceptable carriers, the proportion of which is determined by the solubility and chemical nature of the compound, chosen route of administration and standard pharmacological practice. They may be administered orally in the form of solutions or they may be injected parenterally. For parenteral administration they may be used in the form of a sterile solution containing other solutes, for example, enough saline or glucose to make the solution isotonic.

The dosage of the compounds of the present invention will vary with the form of administration and the particular compound chosen. Furthermore, it will vary with the particular animal under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level of about 120 mg./kg. of body weight.

The following examples are given by way of illustration and are not to be construed as limitations of this invention, many variations of which are possible without departing from the scope and spirit thereof.

EXAMPLE I

To a suspension of [(2-benzoyl-4-chlorophenylcarbamoyl)methyl]hydroxy carbamic acid, ethyl ester, ethyl carbonate in ethanol, there is added an excess of an ethanolic solution of sodium hydroxide. The resulting solution is diluted with water, the precipitate collected and recrystallized from ethanol. In this manner, there is obtained [(2-benzoyl - 4 - chlorophenylcarbamoyl) (ethoxy) methyl] carbamic acid, ethyl ester, M.P. 171–172° C.

Analysis.—Calcd. for $C_{20}H_{21}ClN_2O_5$ (percent): C, 59.34; H, 5.23; N, 6.92; Cl, 8.76. Found (percent): C, 59.58; H, 5.33; N, 6.96; Cl, 8.80.

In the same manner, [(2-benzoyl-4-bromophenylcarbamoyl)(ethylmercapto)methyl]carbamic acid, propyl ester and [(2-benzoyl-5-fluorophenylcarbamoyl)(ethoxy)methyl]carbamic acid, methyl ester are synthesized.

EXAMPLE II

To a suspension of [(2-benzoyl-phenylcarbamoyl)methyl]hydroxy carbamic acid, methyl ester, methyl carbonate in methanol there is added an excess of a methanolic solution of potassium hydroxide. The resulting solution is diluted with water, the precipitate collected and recrystallized from methanol. In this manner, there is obtained [(2 - benzoylphenylcarbamoyl)(methoxy)methyl]carbamic acid, methyl ester.

EXAMPLE III

To a suspension of [(2-benzoyl-4-methylphenylcarbamoyl)methyl]hydroxy carbamic acid, methyl ester, methyl carbonate in ethanol there is added an excess of an ethanolic solution of sodium carbonate. The resulting solution is diluted with water, the precipitate collected and recrystallized from ethanol. In this manner, there is obtained [(2-benzoyl-4-methylphenylcarbamoyl)(ethoxy)methyl]carbamic acid, methyl ester.

Similarly, [(2-benzoyl - 4 - methoxyphenylcarbamoyl)methyl]hydroxy carbamic acid, methyl ester, methyl carbonate is converted to [(2-benzoyl-4-methoxyphenylcarbamoyl)(ethoxy)methyl]carbamic acid, methyl ester.

EXAMPLE IV

Employing the procedure as described in Examples I–III to react a nucleophile with an appropriate [(2-benzoylphenylcarbamoyl)methyl]hydroxy carbamic acid, alkyl ester, alkyl carbonate, the following compounds are prepared:

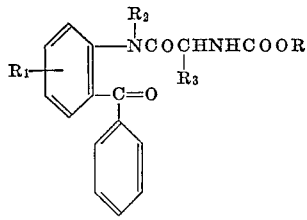

wherein the substituents are:

| R | $R_1$ | $R_2$ | $R_3$ |
|---|---|---|---|
| $CH_3$ | $C_2H_5$ | H | $NH_2$ |
| $C_2H_5$ | $C_3H_7$ | $CH_3$ | $C_2H_5O$ |
| $CH_3$ | $C_2H_5O$ | H | $C_2H_5S$ |
| $C_3H_7$ | $C_3H_7O$ | H | $CH_3O$ |
| $CH_3$ | $CH_3$ | $C_2H_5$ | $CH_3S$ |
| $CH_3$ | H | H | $C_4H_9O$ |
| $C_2H_5$ | H | $C_3H_7$ | $CH_3O$ |

What is claimed is:
1. A compound selected from the group consisting of those having the formula:

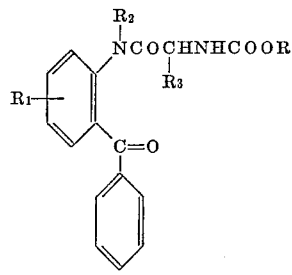

wherein R is lower alkyl; $R_1$ is selected from the group consisting of hydrogen, halogen, lower alkyl, and lower alkoxy; $R_2$ is selected from the group consisting of hydrogen and lower alkyl; and $R_3$ is selected from the group consisting of amino, lower alkoxy and lower alkylthio.

2. A compound as described in claim 1 which is: [(2-benzoyl - 4 - chlorophenylcarbamoyl)(ethoxy)methyl] carbamic acid, ethyl ester.

3. A compound as described in claim 1 which is: [(2-benzoyl - 4 - bromophenylcarbamoyl)(ethylmercapto) methyl]carbamic acid, propyl ester.

4. A compound as described in claim 1 which is: [(2 - benzoylphenylcarbamoyl)(methoxy)methyl]carbamic acid, methyl ester.

5. A compound as described in claim 1 which is: [(2-benzoyl - 4 - methylphenylcarbamoyl)(ethoxy)methyl] carbamic acid, methyl ester.

6. A compound as described in claim 1 which is: [(2-benzoyl - 4 - methoxyphenylcarbamoyl)(ethoxy)methyl] carbamic acid, methyl ester.

References Cited

UNITED STATES PATENTS 3,202,699  8/1965  Stempel _____ 260—471

LORRAINE A. WEINBERGER, Primary Examiner

E. J. GLEIMAN, Assistant Examiner

U.S. Cl. X.R.

260—471; 424—309